(12) United States Patent
Sundaram et al.

(10) Patent No.: US 7,966,364 B2
(45) Date of Patent: Jun. 21, 2011

(54) SYSTEM AND METHOD FOR VIRTUAL SERVER MIGRATION ACROSS NETWORKS USING DNS AND ROUTE TRIANGULATION

(75) Inventors: Ravi Sundaram, Cambridge, MA (US); Nathan Faber, Allston, MA (US)

(73) Assignee: Northeastern University, Boston, MA (US)

( * ) Notice: Subject to any disclaimer, the term of this patent is extended or adjusted under 35 U.S.C. 154(b) by 374 days.

(21) Appl. No.: 12/180,813

(22) Filed: Jul. 28, 2008

(65) Prior Publication Data
US 2009/0198817 A1    Aug. 6, 2009

Related U.S. Application Data

(60) Provisional application No. 60/962,134, filed on Jul. 26, 2007.

(51) Int. Cl.
*G06F 15/16* (2006.01)
*G06F 15/177* (2006.01)

(52) U.S. Cl. .................. 709/201; 709/220; 709/227

(58) Field of Classification Search .............. 709/227, 709/201, 220
See application file for complete search history.

(56) References Cited

U.S. PATENT DOCUMENTS

| 7,080,051 B1* | 7/2006 | Crawford | 705/400 |
| 2001/0047421 A1* | 11/2001 | Sridhar et al. | 709/230 |
| 2002/0078218 A1* | 6/2002 | Feig | 709/231 |
| 2004/0153709 A1* | 8/2004 | Burton-Krahn | 714/4 |
| 2007/0028239 A1* | 2/2007 | Dyck et al. | 718/1 |
| 2008/0115129 A1* | 5/2008 | Hintermeister et al. | 718/100 |
| 2008/0162724 A1* | 7/2008 | Hietasarka | 709/245 |
| 2009/0083376 A1* | 3/2009 | Dowlmg et al. | 709/203 |

OTHER PUBLICATIONS

Su, Gong et al. "Mobile Communication with Virtual Network Address Translation," Technical Report CUCS-003-02, Dept. of Computer Science, Columbia University, Feb. 2002.

* cited by examiner

*Primary Examiner* — Patrice L Winder
*Assistant Examiner* — Ebrahim Golabbakhsh
(74) *Attorney, Agent, or Firm* — Weingarten, Schurgin, Gagnebin & Lebovici LLP

(57) ABSTRACT

A first virtual server is moved from a first network location to a second network location without interrupting service to users of the first virtual server. The state and data of the first virtual server are copied and transmitted to the second network location to create a copy of the first virtual server. The first virtual server copy is then updated to duplicate the first virtual server and all connections or packets directed to the first virtual server are intercepted and directed to the first virtual server copy at the second network location. A DNS entry for the symbolic name of the first virtual server is updated to reflect a shortened TTL value and then the address field of the DNS entry is set to the address of the first virtual server copy after the changeover and subsequent connections are directed to the first virtual server copy.

14 Claims, 5 Drawing Sheets

SYSTEM AND METHOD FOR VIRTUAL SERVER MIGRATION ACROSS NETWORKS USING DNS AND ROUTE TRIANGULATION

RELATED APPLICATIONS

This application is a non-provisional application of U.S. Ser. No. 60/962,134, entitled "System And Method For Virtual Server Migration Across Networks Using DNS And Route Triangulation," filed Jul. 26, 2007, the entire contents of which is hereby incorporated by reference for all purposes.

FIELD OF THE INVENTION

Embodiments of the present invention are directed to migrating virtual servers across a network without interruption of service.

BACKGROUND OF THE INVENTION

It is hard to imagine, for many people, the world without the Internet. With the Internet, data no longer resides only on one's own personal computer. Much of our data, for example, address books, e-mail, documents, and other enormous amounts of information, are stored in various locations, on various servers, located around the world. Being able to access these remote locations from anywhere in the world, via the Internet, allows us to access a coherent view of our data at almost any time that we desire. All we need is a computer with access to the Internet, be it wired or wireless.

The Internet, publicly accessible and available throughout the world, interconnects computer networks and, therefore, the computers on those networks. There are millions of networks, or sub-networks, that make up the Internet. The sub-networks are used by governments, educational institutions, businesses, etc. It is most likely that the Internet is taken for granted in many instances, similar to that of other utilities such as water, electricity and gas.

Referring to FIG. 1, a simplified representation of the Internet includes the Inter-network, i.e., the Internet itself, connected to a first sub-network 102 and a second sub-network 104. The first sub-network 102 may have a first device 106 connected to it. The first device 106 could be a computer, a server, etc. Similarly, the second sub-network 104 has devices 108, 110, 112 connected to it.

To communicate between two devices on the Internet, data is transmitted by packet switching using the standard Internet Protocol (IP.) In order to communicate with each other, each device is given an IP address consisting of a series of numbers, e.g., 129.10.24.150. Each IP address is unique, much like a telephone number. Thus, for example, packets may be sent from a device 114 through the Internet, through the second sub-network 104 and to the device 112.

The Domain Name System (DNS) is used to correspond the numerical IP address with a more accessible, i.e., more easily understood, symbolic representation. This most often is used when surfing the world wide web and rather than having to remember the IP address for a website, a user merely types in an easily understandable string of characters, such as, www.neu.edu. A domain name server 116 is connected to the Internet and provides for the cross-reference of the human-readable address, i.e., the symbolic name, with the numerical IP address.

The operation of the Internet and the DNS system is well known to those of ordinary skill in the art and the foregoing is provided as a very broad, and relatively simple, overview.

Server migration, i.e., moving a server or computer from one location to another, across wide area networks is faced by many enterprises in various contexts. As above, many applications and associated data are hosted on servers on remote data centers around the world and accessed via the Internet. Many of these applications and servers must be up 24 hours a day, seven days a week. Of course, this type of availability is only a goal and there are real-world maintenance requirements and other unforeseen events that can cause a disruption in service.

For example, referring now to FIG. 2, it may become necessary to move device 112 from the second sub-network 104 to a location on the first sub-network 102, as identified by the dotted representation of the device 112. Moving the device 112 from the second sub-network 104 to the first sub-network 102, however, requires that the device 112 be given a different IP address. This is due to the fact that the first and second sub-networks 102, 104 provide the devices connected to them, respectively, with different prefixes with respect to the device's IP address. Thus, the IP address that device 112 had on the second sub-network 104 would not work on the first sub-network 102.

Accordingly, when the device 112 is moved, any entries for that device in the DNS server 116 would need to be changed. As is known, there are mechanisms for providing new IP addresses to an entry in the DNS registry so that the underlying changes are invisible to anyone who types in the symbolic address for a desired location.

Moving a machine from one sub-network to another, especially across a large geographic distance, however, may cause a certain amount of unavailability of the system.

Accordingly, what is needed is a mechanism to eliminate the unavailability of a system that needs to be moved from one sub-network to another, or across a large geographic distance.

SUMMARY OF THE INVENTION

One embodiment of the present invention, a method of moving operation of a first virtual server from a first network location to a second network location, comprises: copying current operating data of the first virtual server; establishing a second virtual server at the second network location using the copied current operating data of the first virtual server; diverting data addressed to the first virtual server to the second virtual server at a predetermined time after establishing the second virtual server; and the second virtual server processing the diverted data and sending a response back to an origin of the diverted data, wherein the response from the second virtual server appears, to the origin, to have come from the first virtual server.

In another embodiment of the present invention, a method of moving operation of a first virtual server from a first network location to a second network location, the method comprises: suspending operation of the first virtual server and duplicating first operating data of the first virtual server subsequent to suspending the first virtual server; establishing, subsequent to suspending the first virtual server, a second virtual server at the second network location using the duplicated first operating data, the second virtual server being a copy of the first virtual server; starting operation of the second virtual server; forwarding, to the second virtual server, data addressed to a first network address of the first virtual server; returning a response from the second virtual server to an origin of the forwarded data, the returned response appearing, to the origin, to have come from the first virtual server; and modifying, at a time prior to suspending operation of the first virtual server, a DNS entry associated with a symbolic name of the first virtual server.

Another embodiment, a system for moving operation of a first virtual server from a first network location to a second network location, comprises: means for copying current operating data of the first virtual server; means for establishing a second virtual server at the second network location using the copied current operating data of the first virtual server; means for diverting data addressed to the first virtual server to the second virtual server at a predetermined time after establishing the second virtual server; and means for the second virtual server processing the diverted data and sending a response back to an origin of the diverted data, wherein the response from the second virtual server appears, to the origin, to have come from the first virtual server.

BRIEF DESCRIPTION OF THE DRAWINGS

The above and further advantages of the present invention may be better understood by referring to the following description in conjunction with the accompanying drawings in which.

Figure 1:
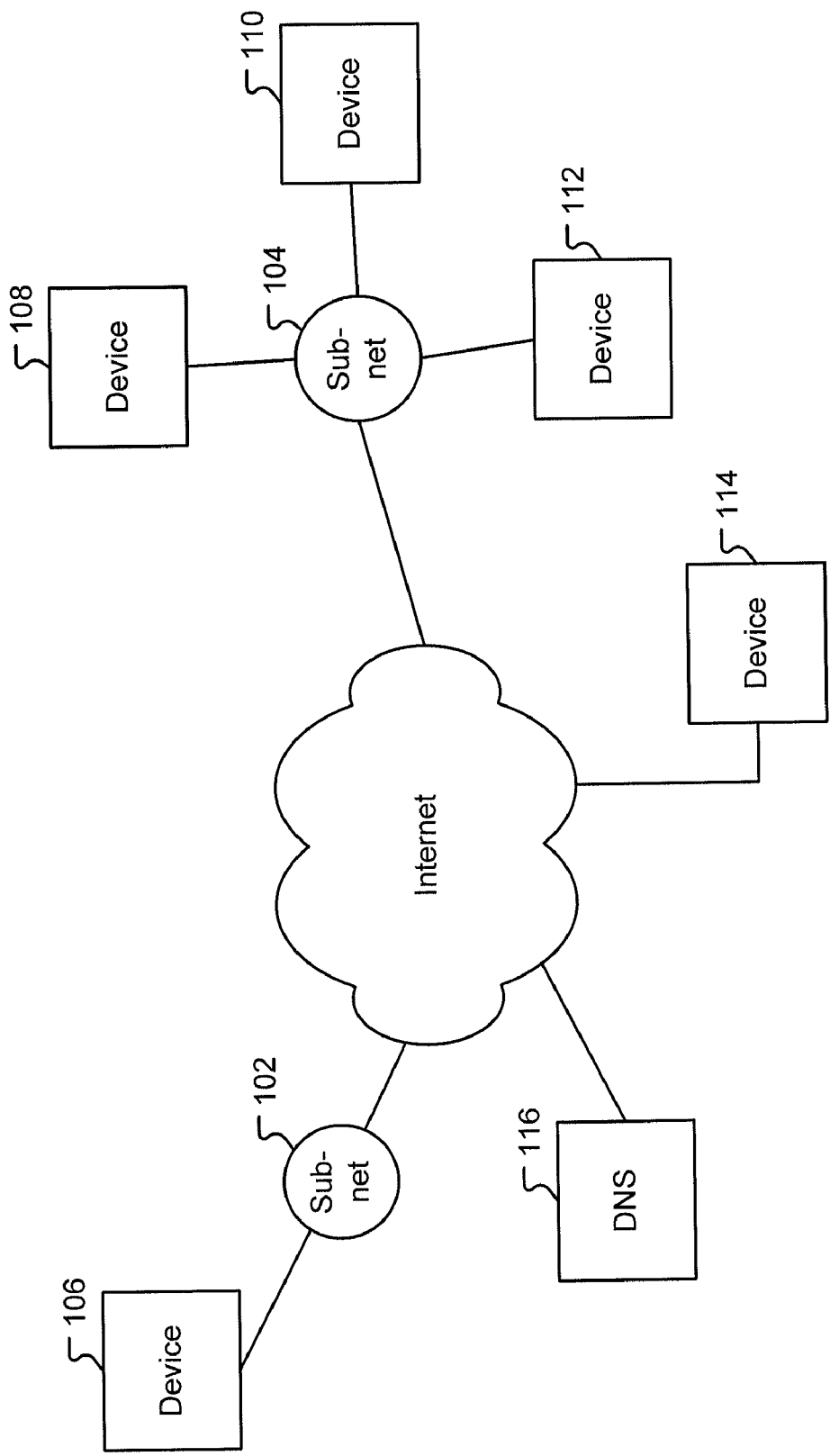
FIG. 1 is a block diagram representation of the Internet.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

The entire contents of U.S. provisional patent application Ser. No. 60/962,134, entitled "System And Method For Virtual Server Migration Across Networks Using DNS And Route Triangulation," filed Jul. 26, 2007, are hereby incorporated by reference for all purposes.

Embodiments of the present invention combine virtualization technology, DNS services, and routing triangulation to facilitate seamless movement of server operations across the Internet. With virtualization, a computer and all of its applications, can be easily moved from one hardware platform to another. The DNS services and the routing triangulation provide for continuity of operation.

In the following detailed description, numerous specific details are set forth in order to provide a thorough understanding of embodiments of the present invention. It will be understood by those of ordinary skill in the art that embodiments of the present invention may be practiced without some of these specific details. In other instances, well-known methods, procedures, components and structures may not have been described in detail so as not to obscure the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

Further, it should be noted that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Using virtualization, as known to one of ordinary skill in the art, a software implementation referred to as a virtual machine (VM) executes programs just like a real or physical computer and appears, to any user of the virtual machine, to have all the resources and capabilities of the physical computer. Virtual machines provide for the sharing of the underlying physical machine resources between virtual machines as well as provide isolation from one virtual machine to another although they may be running on the same underlying hardware. Thus, with virtualization, multiple operating system environments can coexist on the same computer and yet be isolated from one another.

Virtualization of computing environments allows a new breed of computing where the user's environment appears unique to them and completely customizable, yet is being run from within a shared environment. Virtualization techniques range from isolation to full-fledged virtualization. An isolated setup allows a single computer to be sliced into multiple virtual machines.

With a virtual machine, the entire operating system's data is isolated to a single directory on the physical machine. Thus, a user that has been given an isolated setup, e.g., a virtual server, can maintain and own the virtual server regardless of the physical machine upon which it is running. As the setup is isolated to a single directory contained within a main operating system, the virtual server can be moved to another machine. Without the benefits of virtualization, such a move would require that the machine itself be physically migrated, i.e., moved.

As above, physical migration requires that either a machine be moved or a new machine be provided with the necessary operating system, all the software, and all of the data from the old machine.

In one embodiment of the present invention, the systems or devices 106, 108, 110, 112, for example, have been virtualized. For example, the Converter product from VMware, Inc., Palo Alto, Calif. can be used to accomplish the virtualization. Other embodiments of the present invention may involve the migration or moving of virtual machines that may have never been implemented as physical machines, i.e., having always been implemented as virtual machines or virtual servers.

Figure 3:
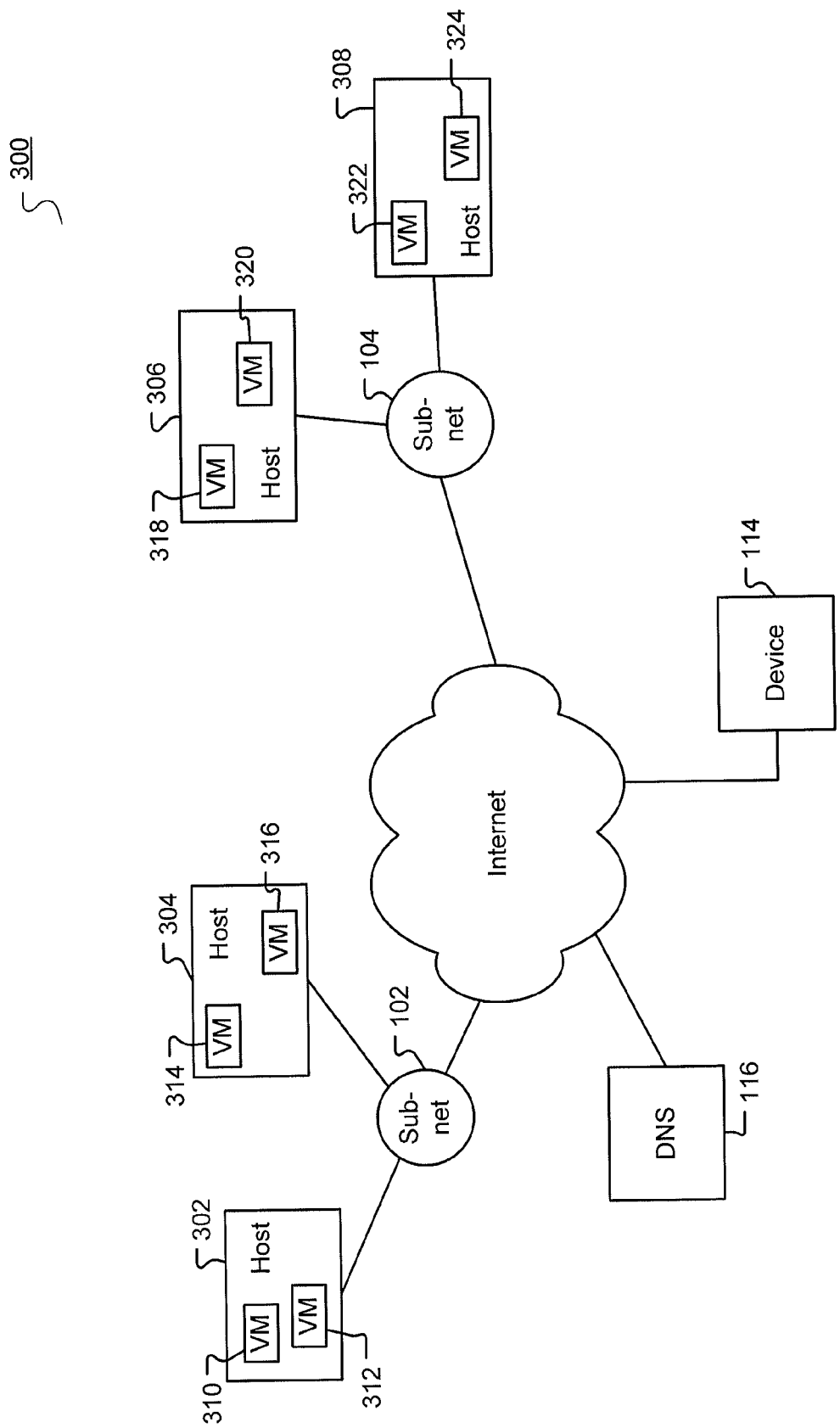
FIG. 3 is a block diagram representation of a network and an embodiment of the present invention.

Referring to FIG. 3, a system 300 includes the first sub-network 102 with first and second hosts, 302, 304 connected thereto. Third and fourth hosts, 306, 308 are connected to the second sub-network 104.

Figure 2:
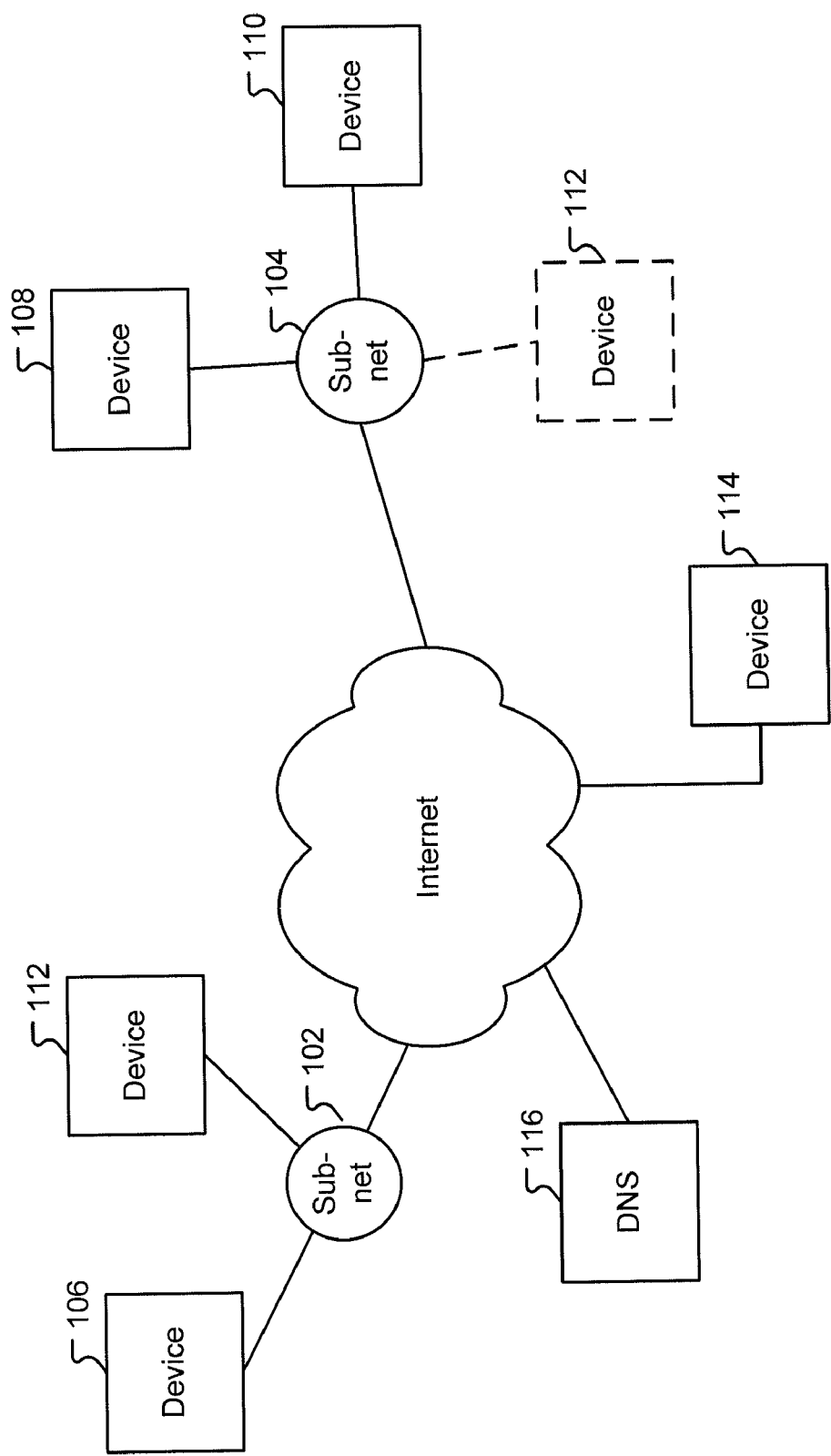
FIG. 2 is a block diagram representation of moving a device on the Internet.

Each of the hosts 302, 304, 306, 308, is a hardware platform, for example, a computer server or PC comprising one or more CPUs, memory, disk storage, I/O devices, etc. Each of the hosts 302, 304, 306, 308 has one or more virtual machines some of which could be considered the functional equivalent of the devices 106, 112, 108, 110, as shown in FIG. 2.

For example, the first host 302 includes a first virtual machine 310 and a second virtual machine 312. Each of the first and second virtual machines 310, 312 operates separately from each other but shares the underlying hardware of the host 302. Further, in one example for purposes of explanation, each of the first and second virtual machines 310, 312 may have its own respective IP address through which it connects to any other device or system on the Internet, and for which it has a respective DNS entry as understood by those of ordinary skill in the art.

The second host 304 includes a third virtual machine 314 and a fourth virtual machine 316. On the second sub-network 104, a third host 306 includes a fifth virtual machine 318 and a sixth virtual machine 320. Finally, a fourth host 308 includes a seventh virtual machine 322 and an eighth virtual machine 324.

While the foregoing shows a system 300 where each host includes virtual machines, embodiments of the present invention are not limited to those networks where hosts only include virtual machines and there may be a mix of virtualized and non-virtualized servers and/or services on a network. Accordingly, the claims of the present application are not to be limited to only a virtualized environment unless explicitly stated as a limitation of a claim.

As an example, a situation may arise where a virtual machine needs to be moved from one host to another host where the destination host is on a different sub-network than the original host. Such a move would necessitate changing the IP address of the virtual machine being moved.

Figure 4:
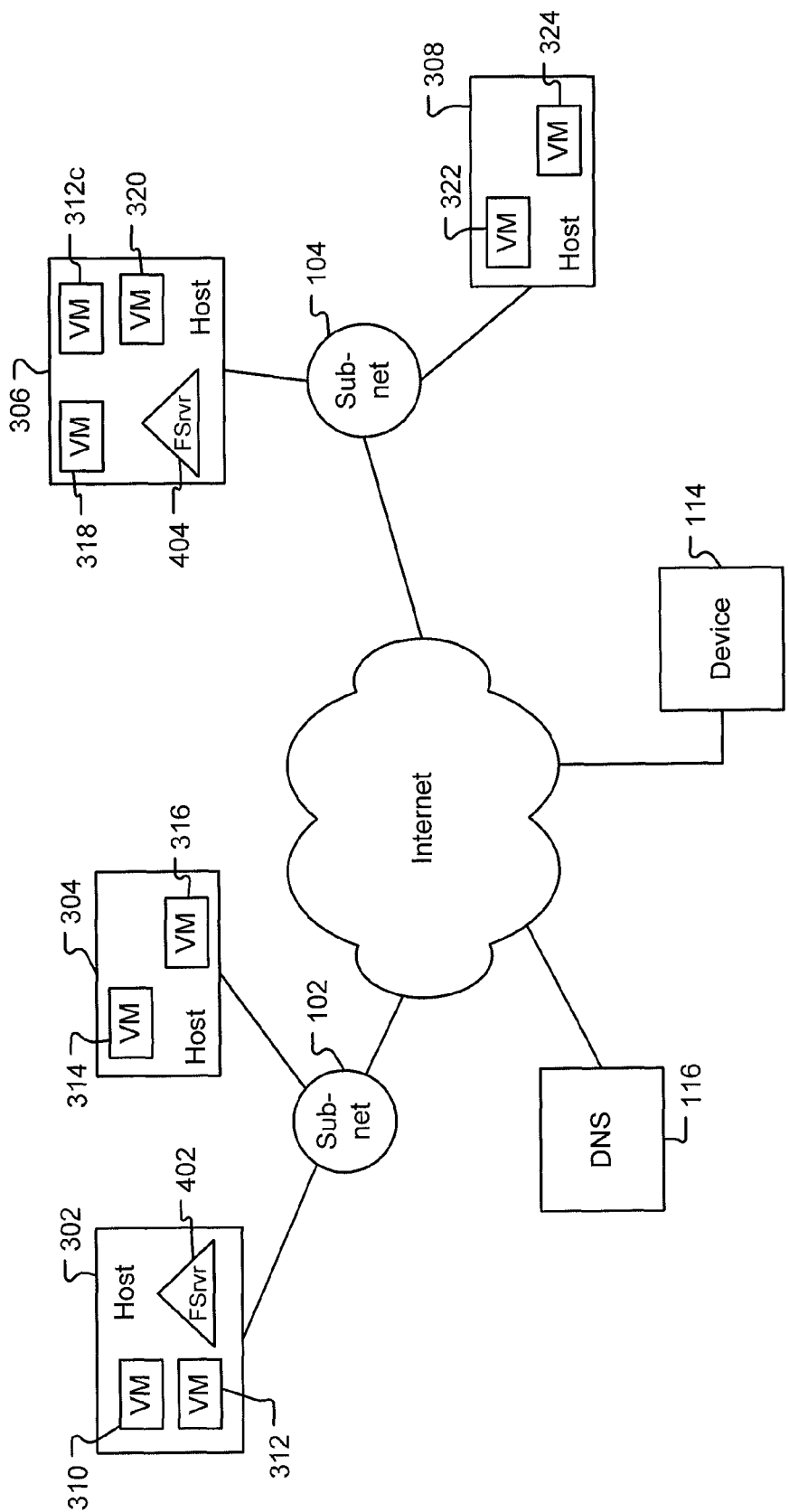
FIG. 4 is a block diagram representation of a network and an embodiment of the present invention.

Referring now to FIG. 4, an example of moving the second virtual machine 312 will now be described. Initially, a copy of the second virtual machine 312 is made. The virtualization and the "compartmentalization" or isolation of the second virtual machine 312 from the other virtual machines on the first host 302 facilitates making such a copy. Of course, as the second virtual machine 312 is still operating, any copying of data would be a "snapshot" in time and, therefore, any updates, or subsequent changes, would need to be captured. The capturing of the subsequent changes will be described below.

As shown, a copy or duplicate of the second virtual machine 312 is provided in the third host 306 and referred to herein as copied virtual machine 312c. The copied virtual machine 312c is then brought up to operation on the third host 306.

The copied virtual machine 312c, is provided with its own IP address by mechanisms known to those of ordinary skill in the art. This new IP address, however, is different from the IP address that the second virtual machine 312 is using and which is currently being used by those devices having a connection with the second virtual machine 312.

In order to provide for a seamless transition of operation, i.e., one that is not noticed by those having current connections with the second virtual machine 312, a first virtual forwarding server (FSrvr) 402 is provided on the first host 302 and a second virtual forwarding server 404 is provided on the third host 306.

Prior to initiating the operation of the first and second virtual forwarding servers 402, 404, the copied virtual machine 312c must be synchronized with the second virtual machine 312, i.e., the original, one last time. In accordance with one embodiment of the present invention, the operation of the second virtual machine 312 is suspended in order to facilitate the transfer of the difference data, i.e., the changes to the second virtual machine 312 since the last synchronization with the copied virtual machine 312c. Of course, the time for doing this would be chosen to be as minimally interruptive to users of the system as possible while at the same time minimizing the amount of difference data that needs to be transmitted across the network. After this last synchronization, all the information or data necessary to run the copied virtual machine 312c on the host 306 is now available.

Once the last synchronization has been completed, the operation of the first and second virtual forwarding servers 402, 404 begins. Connections that were pending at the time will be intercepted by the first virtual forwarding server 402 and diverted.

The first virtual forwarding server 402 is configured to intercept packets destined for the second virtual machine 312 and forward them to the second virtual forwarding server 404. The second virtual forwarding server 404 directs the forwarded packets to the copied virtual machine 312c, receives packets back from the copied virtual machine 312c in response thereto, and forwards any response back to the first virtual forwarding server 402. The first virtual forwarding server 402 then returns the response to the origin of the connection and "spoofs" the IP address of the second virtual machine 312. As a result, the origin of the forwarded packets connection believes that it is communicating with the second virtual machine 312 and not with its copy. By maintaining an appearance of the response as coming from the second virtual machine 312c, any firewalls operating at the origin will allow the communication to come through.

At the same time, or very close thereto, that the diversion begins, the DNS entry information for the second virtual machine 312 is changed so that connections directed to the "old" location of the second virtual machine 312 will now go to the new IP address of the copied virtual machine 312c on the third host 306.

In one embodiment of the present invention, the time to live (TTL) field in the DNS information is set so as to count down to coincide with the time of migration. In other words, the "old" DNS information for the IP address of the second virtual machine 312 on the first host 302 is given an expiration date. According to embodiments of the present invention, the TTL is set so as to coincide as closely as possible with the switchover from the second virtual machine 312 operating on the first host 302 to the copied virtual machine 312c operating on the third host 306.

To maintain current connections to the old IP address of the virtual machine 312, that is, the connections "appear" to be maintained, from a perspective of those connected to the second VM 312, the first and second virtual forwarding servers 402, 404 continue to divert and handle those packets of data.

Once the migration has taken place, DNS responses to queries directed to the symbolic name, e.g., www.neu.edu, will be provided with the IP address associated with the copied virtual machine 312c on the host 306. As a result, over time, there should be fewer packets or connections directed to the old IP address of the second virtual machine 312 and the amount of traffic seen by the first and second virtual forwarding servers 402, 404, at least with respect to the second virtual machine 312, should become negligible.

Once the amount of traffic has dropped below some threshold level, or stopped entirely, operation of the first and second virtual forwarding servers 402, 404 may be suspended and their instances removed from their respective hosts. In an alternate embodiment, the first and second virtual forwarding servers 402, 404 remain active as the processing load presented by these applications is relatively low.

Once the operation is taken over by the copied virtual machine 312c, the original second virtual machine 312 may be removed from the host and the IP address associated with the second virtual machine 312 can be reused or reassigned.

Figure 5:
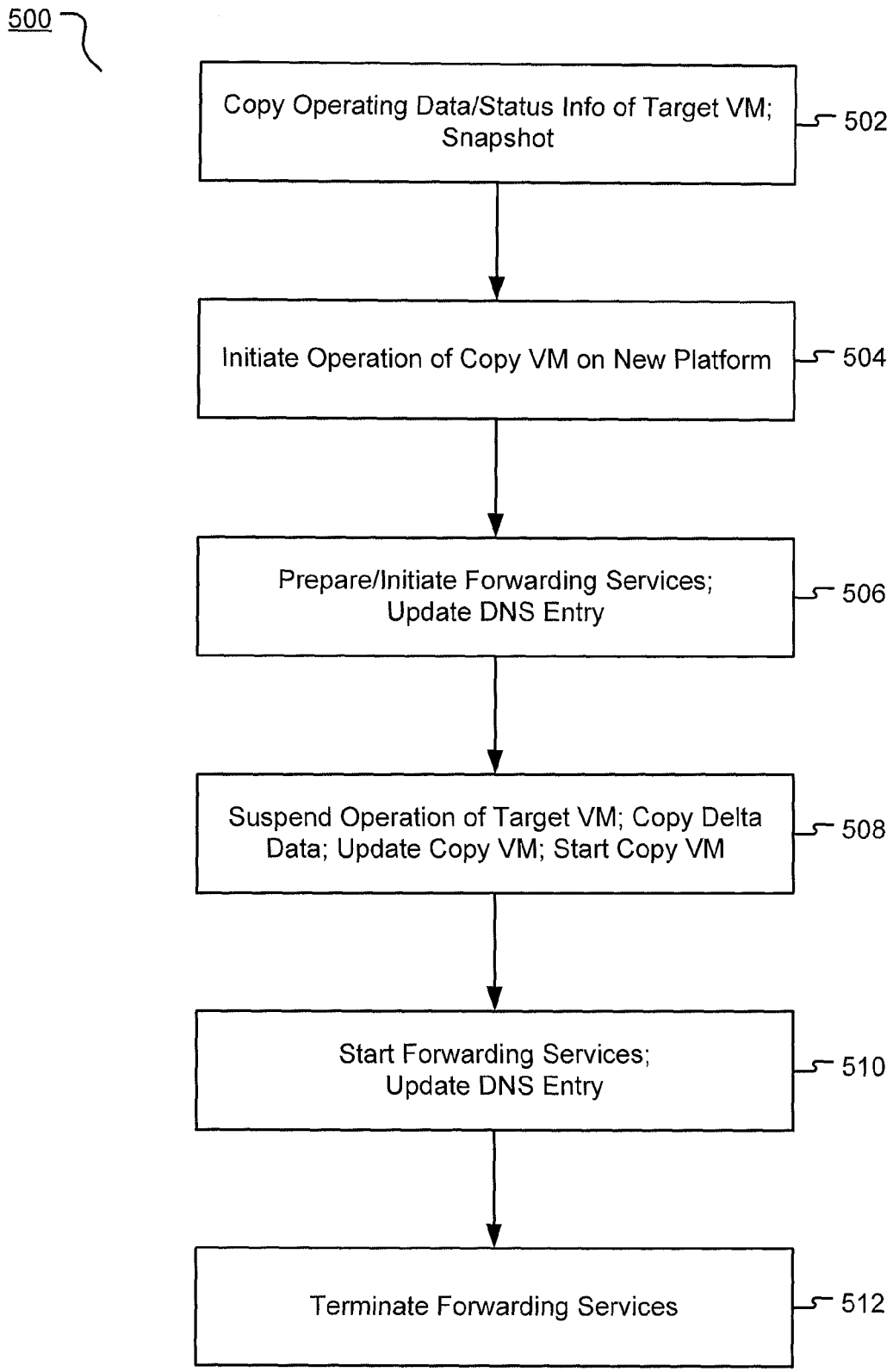
FIG. 5 is a flow chart of a method in accordance with one embodiment of the present invention.

In accordance with one embodiment of the present invention, a method 500 of migrating a virtual machine across a network is provided, as shown in FIG. 5. Initially, if not already present, the server/applications/services to be migrated are virtualized. Once virtualized, a copy of all data and state information is made and transmitted or provided to the target host, step 502. Using the foregoing example, the data and state information of the second virtual machine 312 would be copied and sent to the third host 306. As the second virtual machine 312 is still running, however, this is only a "snapshot" of the data, as it is likely to change with continued operation. Advantageously, as is known, only subsequent changes need to be collected in order to update. Using the copied data, another virtualized instance of the original is brought up, step 504. Here, the copied virtual machine 312c would use the data to begin its operation at the same state/data configuration point as the second virtual machine 312 when the snapshot was taken. A forwarding service is provided on the original host and correspondingly on the target host, i.e., the host on which the copied virtual instance is provided, step 506. Also, at step 506, the DNS entry for the second virtual machine 312 is updated to indicate that the current information in the DNS entry has an expiration date. A Time To Live (TTL) field is set such that the current DNS entry information is identified as becoming invalid at about the time that the migration is to occur. This can be set by the authoritative name server for the domain, as known to those of skill in the art.

Once it is determined that the migration will be completed, the original virtual machine is suspended long enough for the changes in data/state to be gathered and transmitted over to the copy, step 508. Thus, the second virtual machine 312 is suspended and an incremental backup is implemented. The difference between this state of operation and the state of operation of the copied virtual machine 312c is determined in order to make the copied virtual machine 312c the same as the second virtual machine 312. At this point, the copy is ready to take over operation and the connections with the original are diverted via the forwarding services, step 510, such that operation continues, and the pending connections have no indication that their communications or packets are being diverted from the original service.

At a same time, step 510, that the copy is up and running, the DNS entry for the symbolic name of the original system is modified to identify the IP address of the new location. As time goes by, there should be fewer connections directed to the old IP address and eventually there is no need for forwarding and redirecting connections. The forwarding service can then be shut down, step 512 or, optionally, kept running in the event that it is important to catch any other late or straggling connections.

While the foregoing embodiments show the first and second virtual forwarding servers 402, 404 as being provided on the respective hosts, it is possible that these functions could be incorporated in a hub or router on the respective network. The forwarding function can be implemented anywhere the destination address of the packet can be determined in order to direct it appropriately.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. It is, therefore, to be understood that the appended claims are intended to cover all such modifications and changes as fall within the true spirit of the present invention.

What is claimed is:

1. A method of moving operation of a first virtual server from a first network location having a first network address to a second network location having a second network address different from the first network address, the method comprising:

copying first operating data representing a first state of operation of the first virtual server at a first time;

establishing a second virtual server in the first state of operation at the second network location using the copied first operating data of the first virtual server;

subsequent to establishing the second virtual server in the first state of operation, pausing operation of the first virtual server and copying additional operating data representing a second state of operation of the first virtual server;

while the first virtual server is paused, establishing the second virtual server in the second state of operation using the copied additional operating data of the first virtual server;

diverting data addressed to the first virtual server at the first network address to the second virtual server at the second network address starting at a predetermined time after establishing the second virtual server in the second state of operation; and the second virtual server processing the diverted data and sending a response back to an origin of the diverted data, wherein the response from the second virtual server appears, to the origin of the diverted data, to have come from the first virtual server located at the first network address.

2. The method of claim 1, further comprising:
   updating a DNS entry for a first symbolic name associated with the first virtual server.

3. The method of claim 2, wherein updating the DNS entry further comprises:
   setting an expiration value for the first network address associated with the first virtual server.

4. The method of claim 2, wherein updating the DNS entry comprises:
   setting a network address value associated with the first symbolic name to the second network address of the second virtual server.

5. A method of moving operation of a first virtual server from a first network location having a first network address to a second network location having a second network address different from the first network address, the method comprising:
   copying first operating data representing a first state of operation of the first virtual server at a first time;
   establishing a second virtual server in the first state of operation at the second network location using the copied first operating data of the first virtual server;
   subsequent to establishing the second virtual server in the first state of operation, pausing operation of the first virtual server and copying additional operating data representing a second state of operation of the first virtual server subsequent to pausing the first virtual server;
   establishing, subsequent to pausing the first virtual server, the second virtual server in the second state of operation at the second network location using the copied additional operating data, the second virtual server being a copy of the first virtual server subsequent to being paused;
   starting operation of the second virtual server subsequent to the second virtual server being established in the second state of operation;
   forwarding, to the second virtual server, data addressed to the first network address of the first virtual server subsequent to the second virtual server starting operation;
   returning a response from the second virtual server to an origin of the forwarded data, the returned response appearing, to the origin, to have come from the first virtual server at the first network address; and
   modifying, at a time prior to suspending operation of the first virtual server, a DNS entry associated with a symbolic name of the first virtual server.

6. The method of claim 5, wherein modifying the DNS entry comprises:
   setting an expiration field to expire at a time prior to suspending operation of the first virtual server.

7. The method of claim 5, wherein modifying the DNS entry comprises:
   setting a network address field to the second network address associated with the second virtual server after starting operation of the second virtual server.

8. The method of claim 5, wherein forwarding data addressed to the first network address comprises:
   forwarding data only for a connection to the first virtual server established prior to suspending operation of the first virtual server.

9. The method of claim 5, wherein forwarding data addressed to the first network address comprises:
   forwarding data received within a predetermined time period of starting operation of the second virtual server.

10. The method of claim 5, further comprising:
    no longer forwarding data directed to the first network address at a predetermined time after starting operation of the second virtual server.

11. The method of claim 5, further comprising:
    measuring an amount of data directed to the first network address; and
    no longer forwarding data directed to the first network address when the measured amount of data is below a predetermined threshold.

12. The method of claim 11, wherein the predetermined threshold comprises at least one of:
    a predetermined amount of data;
    a predetermined amount of data received over a predetermined amount of time; and
    a predetermined rate of data.

13. A system for moving operation of a first virtual server from a first network location having a first network address to a second network location having a second network address different from the first network address, the system comprising:
    means for copying first operating data representing a first state of operation of the first virtual server at a first time;
    means for establishing a second virtual server in the first state of operation at the second network location using the copied first operating data of the first virtual server;
    means for, subsequent to the second virtual server being established, pausing operation of the first virtual server and copying additional operating data representing a second state of operation of the first virtual server;
    means for, while the first virtual server is paused, establishing the second virtual server in the second state of operation using the copied additional operating data of the first virtual server;
    means for diverting data addressed to the first virtual server at the first network address to the second virtual server at the second network address starting at a predetermined time after establishing the second virtual server in the second state of operation; and
    means for the second virtual server processing the diverted data and sending a response back to an origin of the diverted data,
    wherein the response from the second virtual server appears, to the origin of the diverted data, to have come from the first virtual server located at the first network address.

14. The system of claim 13, further comprising:
    means for updating a DNS entry for a first symbolic name associated with the first virtual server; and
    means for setting an expiration value in the DNS entry for the first network address associated with the first virtual server.

* * * * *